July 12, 1938.   H. H. SHERBONDY   2,123,637
VALVE CONTROL APPARATUS
Filed June 10, 1937
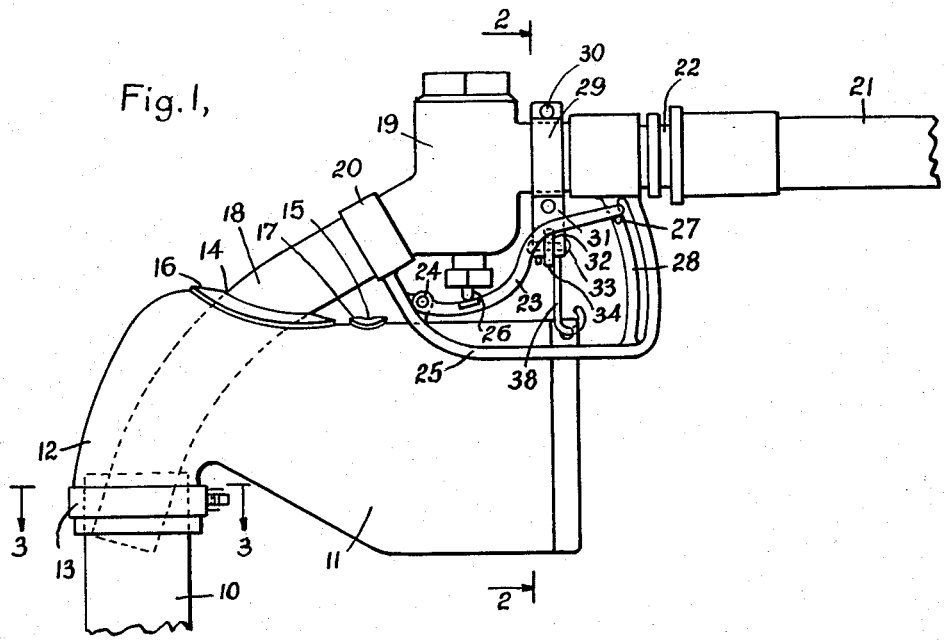
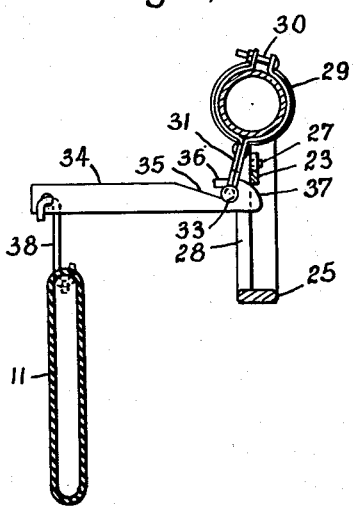
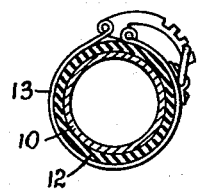
INVENTOR
HENRY HARRISON SHERBONDY
BY
ATTORNEYS Patented July 12, 1938

2,123,637

UNITED STATES PATENT OFFICE 2,123,637

VALVE CONTROL APPARATUS

Henry Harrison Sherbondy, Bala Cynwyd, Pa.

Application June 10, 1937, Serial No. 147,399

3 Claims. (Cl. 226—127)

This invention relates to apparatus for controlling the operation of valves. More particularly, the invention relates to apparatus designed to effect prompt closure of a valve through which a liquid is flowing to a container when a quantity of liquid in excess of the container's capacity discharges through the valve. The apparatus of the invention is particularly well suited for use in connection with valves, such, for example, as the so-called "Wheaton" valve, comprising means urging the valve to a closed position, a handle for opening the valve, and a catch for engaging the valve handle to hold the valve in an open position.

It is not an infrequent occurrence, when filling tanks and other receptacles with a liquid passing to the tank through a valve, to have liquid in an amount greater than the tank is able to receive delivered thereto before the valve controlling flow of the liquid can be closed. Overflow and waste of the liquid, sometimes coupled with property damage, is the usual result of such an occurrence. In making fuel oil deliveries from trucks equipped with automatic metering mechanism, for example, it is common practice for the operator of the truck to measure or estimate the amount of fuel oil that will be required to fill the tank, to set the metering device to deliver that amount of oil, and, after opening the necessary valves, to await automatic stoppage of the oil flow when the quantity for which the meter is set has been delivered. Not infrequently the operator will have overestimated the quantity of oil that the tank is able to receive, and, if he has done so, the automatic metering mechanism will deliver an excess of oil which, when the tank is full, overflows and may cause considerable damage as well as resulting in a waste of the excess quantity of oil thus delivered.

The apparatus of the present invention is designed to avoid overflow and waste of liquid such as fuel oil being delivered to a tank or other receptacle through a valve by providing automatic means for effecting closure of the valve promptly when the tank has become full, and without regard to the amount of liquid that has been delivered. The apparatus by which this result is accomplished comprises a chamber adapted to receive liquid discharged through a valve in excess of the capacity of the tank or other receptacle being filled, and means actuated by the weight of the excess liquid in the chamber to bring about closure of the valve. Advantageously, the chamber for receiving the excess of liquid is in the form of a flexible bag secured to a nipple adapted to be connected to the tank to be filled and through which material is introduced into the tank.

The apparatus of the invention is especially well suited for use in connection with the so-called "Wheaton" valve, or similar valves, comprising means urging the valve to a closed position, a valve handle for opening the valve, and a catch adapted to engage the valve handle and to hold the valve in an open position against the force of the means urging it closed. When the apparatus of the invention is employed in connection with such valves, the means by which the weight of excess material in the chamber or bag effects closure of the valve comprises a cam lever pivotally supported from the body of the valve and linked to the chamber or bag. The cam lever is positioned with respect to the valve handle and the catch so that when the cam lever is acted upon by the weight of liquid in the chamber or bag, the cam lever effects release of the valve handle from the catch holding it in the open position and the valve thereupon closes.

For the purpose of illustrating a specific form of the apparatus of the invention, it is described below and shown in the accompanying drawing in combination with a valve of the so-called "Wheaton" type. In the drawing, Fig. 1 is an elevation of apparatus constructed in accordance with the invention in combination with a "Wheaton" type valve;

Fig. 2 is a cross section of the apparatus shown in Fig. 1, taken along the line 2—2 of Fig. 1; and Fig. 3 is a cross section of the apparatus shown in Fig. 1, taken substantially along the line 3—3 of Fig. 1.

The apparatus shown in the drawing comprises a nipple 10 adapted to be connected with a tank or other receptacle (not shown) to be filled with fuel oil or other liquid. A flexible bag 11 of any suitable material (rubber may be employed if desired, but if oil is the material with which the tank is being filled, oil-proofed fabrics or synthetic rubber products will be more durable in service) is provided with a neck 12 which slips over the upper end of the nipple 10 and is clamped thereto by means of a clamp 13.

A relatively large opening 14 is formed in the bag 11 above the neck 12 thereof, and a small opening or breather 15 extends through the wall of the bag in the vicinity of the large opening 14 to permit free passage of air into and out of the bag. Reinforcing collars 16 and 17 advantageously are provided about the openings 14 and 15, respectively, to strengthen the bag and reduce the danger of tearing it across the openings. The opening 14 and the neck 12 of the bag 11 are so positioned with respect to one another that the nozzle 18 of a "Wheaton", or similar, valve may be passed through the bag and into the upper end of the nipple 10.

The valve to which the nozzle 18 is connected comprises a valve body 19. The nozzle 18 is connected to the valve body 19 on the discharge side thereof by means of a suitable connecting member 20. A hose or other conduit 21 is connected to the body 19 of the valve on the inlet side thereof by means of a suitable coupling 22 and carries the fuel oil or other liquid with which the tank is to be filled to the valve. The valve is provided with a handle 23 secured by a pivotal mounting 24 to a guard member 25. The valve handle 23 bears against a valve stem 26 so that when the handle is moved toward the body 19 of the valve, it forces the valve stem 26 upwardly and thereby opens the valve to permit the discharge of fuel oil or other liquid through the nozzle 18.

A spring (not shown) is mounted within the body 19 of the valve and urges the valve toward a closed position. Consequently, to hold the valve in an open position it is necessary to hold the handle in its position near the body 19 of the valve, either manually or by means of a suitable catch. In the apparatus shown in the drawing, a catch in the form of a small projection or lug 27 extending outwardly from a guard member 28 is provided. The catch 27 is so positioned that when the valve handle is moved to its position adjacent the body 19 of the valve, corresponding to an opening of the valve, the valve handle 23 is supported by the lug 27 and thereby is held in the open position against the force of the spring urging the valve toward a closed position. The end of the valve handle engaging the lug 27 is, of course, capable of slight lateral movement to enable it to be moved outwardly beyond the end of the lug when moved to or from the open position.

A clamp 29 is clamped to the body 19 of the valve by means of a bolt 30. The clamp 29 is provided with a downwardly extending portion 31 in which is formed a slot 32. A pin 33 is carried by the downwardly extending portion 31 of the clamp 29 and extends across the otherwise open end of the slot 32.

A cam lever 34 is pivotally supported by the clamp 29. The cam lever 34 is provided with a recess 35 that is partially closed by a lug 36. The recess 35 with which the cam lever 34 is provided is adapted to receive the pin 33 of the clamp 29, with the lug 36 extending through the slot 32 in the downwardly extending portion 31 of the clamp 29 and supported on the pin 33. Thus, the cam lever is carried by the pin 33 in a manner such that it is free to rock in a vertical plane about the pivot provided by the pin.

The end of the cam lever adjacent the recess 35 and lug 36 by which it is mounted on the clamp 29 is curved convexly to provide a cam surface 37. The cam surface 37 of the cam lever 34 engages the valve handle 23 in a manner such that if the cam lever 34 is moved downwardly adjacent the end remote from the cam surface 37, the cam surface 37 is moved upwardly and the valve handle 23 is displaced laterally to become released from the support of the lug or catch 27.

A linkage element 38, bent at either end to provide hooks, connects the bag 11 adjacent the end remote from the neck 12 with the cam lever 34 at the end remote from the cam surface 37.

In employing the apparatus described above, the nipple 10 is suitably connected to the tank to be filled with oil or other liquid. The neck 12 of the bag 11 is placed over the exposed end of the nipple and is secured in place by the clamp 13. The nozzle 18 is inserted through the opening 14 and through the neck 12 of the bag into the nipple 10. The valve handle 23 is moved to its open position, where it is held by the lug or catch 27, and oil or other liquid begins to flow through the nozzle 18 and the nipple 10 into the tank. The cam lever 34 is mounted on the pin 33 carried by the clamp 29, with the cam surface 37 of the cam lever bearing against the valve handle, and the bag 11 is connected to the cam lever by means of the connecting element 38.

So long as the bag 11 is empty, its weight is insufficient to pull downwardly on the cam lever with enough force to displace the valve handle 23 from its position of support on the lug or catch 27. Consequently, with the bag 11 empty, oil or other liquid continues to flow through the open valve, the nozzle 18, and the nipple 10 into the tank. As soon as the tank becomes full, however, liquid overflows from the nipple 10 into the bag 11 and thereby the weight supported by the cam lever is considerably increased. This increased weight is sufficient to pull the cam lever downwardly enough to displace or release the valve handle from the catch 27, and the valve thereupon is closed by the spring or other means urging it to the closed position.

The apparatus described above has been found to be very effective in avoiding the discharge of excess fuel oil when filling fuel oil tanks. The apparatus is simple and easy to construct. It is sure in its operation, and in the event of a miscalculation in the amount of oil or other liquid that a tank to be filled is capable of receiving, its use results in savings of oil or other liquid and in avoidance of property damage. The apparatus of the invention possesses advantages over valve control apparatus heretofore generally employed in that it is actuated to close the valve when the tank is full and without regard to the pressure in the tank or the volume of liquid that has been delivered to the tank. For these reasons, it is a very valuable adjunct to the equipment generally employed in making fuel oil deliveries and in other operations involving the filling of tanks with oil or other liquids.

I claim:

1. In combination with a valve controlling the flow of liquid to a receptacle being filled and comprising means urging the valve to a closed position, a handle for opening the valve against the force exerted by said means, and a catch adapted to engage the handle to hold the valve in the open position, apparatus for effecting closure of the valve upon the discharge of an excess of liquid therethrough comprising a chamber adapted to receive excess liquid discharged through the valve, a cam lever pivotally supported from the body of the valve and having a cam surface bearing against the valve handle, and means linking the chamber and the cam lever so that the weight of excess liquid in the chamber will actuate the cam lever to release the valve handle from the catch holding the valve in the open position.

2. In combination with a valve controlling the flow of liquid to a receptacle being filled and comprising means urging the valve to a closed position, a handle for opening the valve against the force exerted by said means, and a catch adapted to engage the handle to hold the valve in the open position, apparatus for effecting closure of the valve upon the discharge of an excess of liquid therethrough comprising a nipple adapted to be connected with the receptacle being filled, a flexible bag secured to said nipple and adapted to receive an excess of liquid discharged through the valve, a clamp secured to the body of the valve, a cam lever pivotally supported by said clamp and bearing against the valve handle, and means linking the cam lever and the bag so that the weight of excess liquid in the bag will actuate the cam lever to release the valve handle from the catch holding the valve in the open position.

3. In combination with a valve controlling the flow of liquid to a receptacle being filled and comprising means urging the valve to a closed position, a handle for opening the valve against the force exerted by said means, a catch adapted to engage the handle to hold the valve in the open position, and a delivery nozzle connected to the valve, apparatus for effecting closure of the valve upon the discharge of an excess of liquid to the receptacle comprising a nipple adapted to be connected with the receptacle being filled, a flexible bag secured to said nipple and adapted to receive an excess of liquid overflowing from the receptacle, said bag having an opening for permitting the introduction of the nozzle within the interior of the bag and insertion of the nozzle into the nipple, and means actuated by the weight of liquid in the bag for releasing the valve handle from the catch holding the valve in the open position.

HENRY HARRISON SHERBONDY.